Feb. 9, 1937. E. W. DAVIS 2,070,003
LUBRICATING APPARATUS
Filed July 7, 1934 2 Sheets-Sheet 1
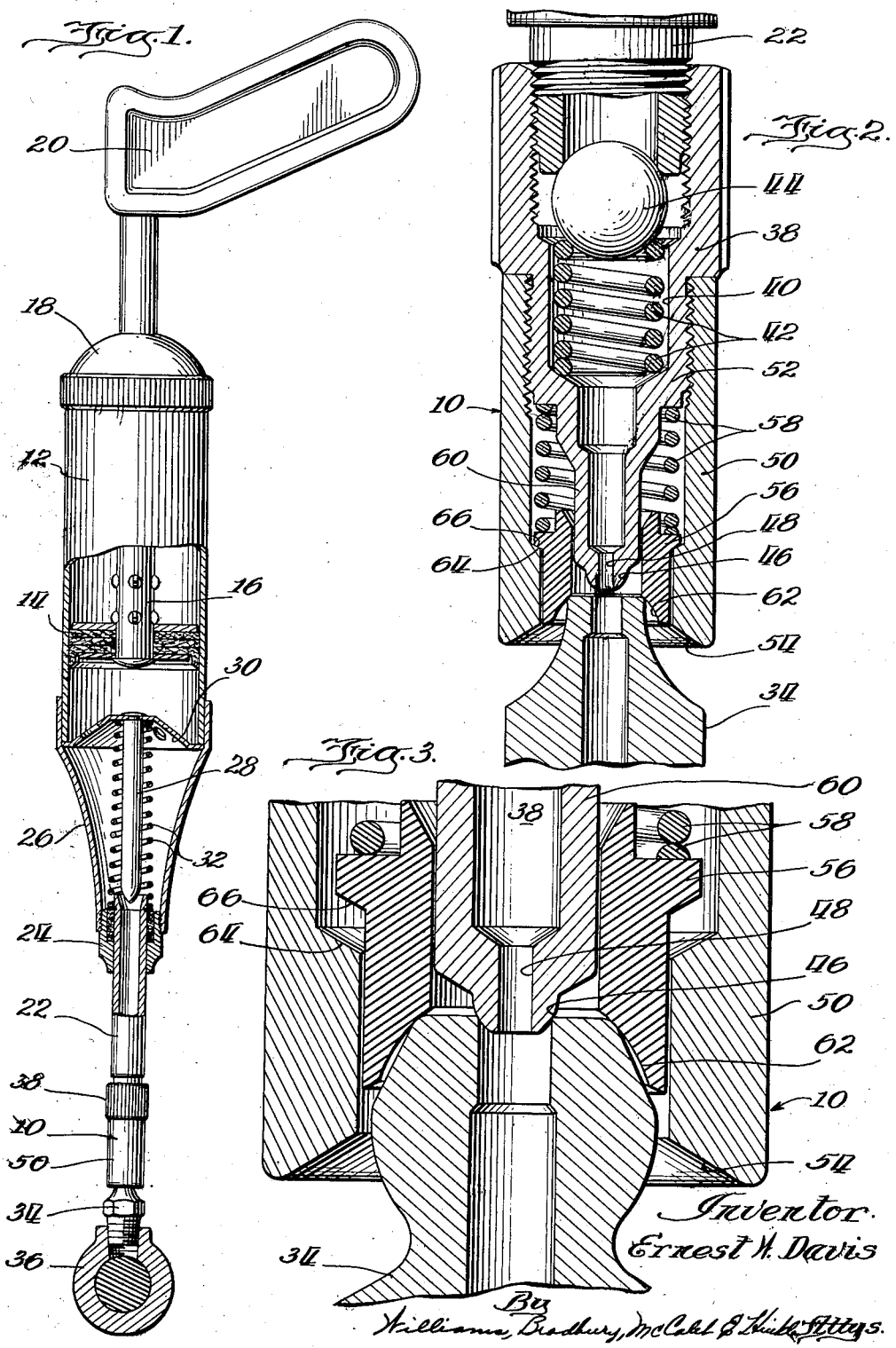

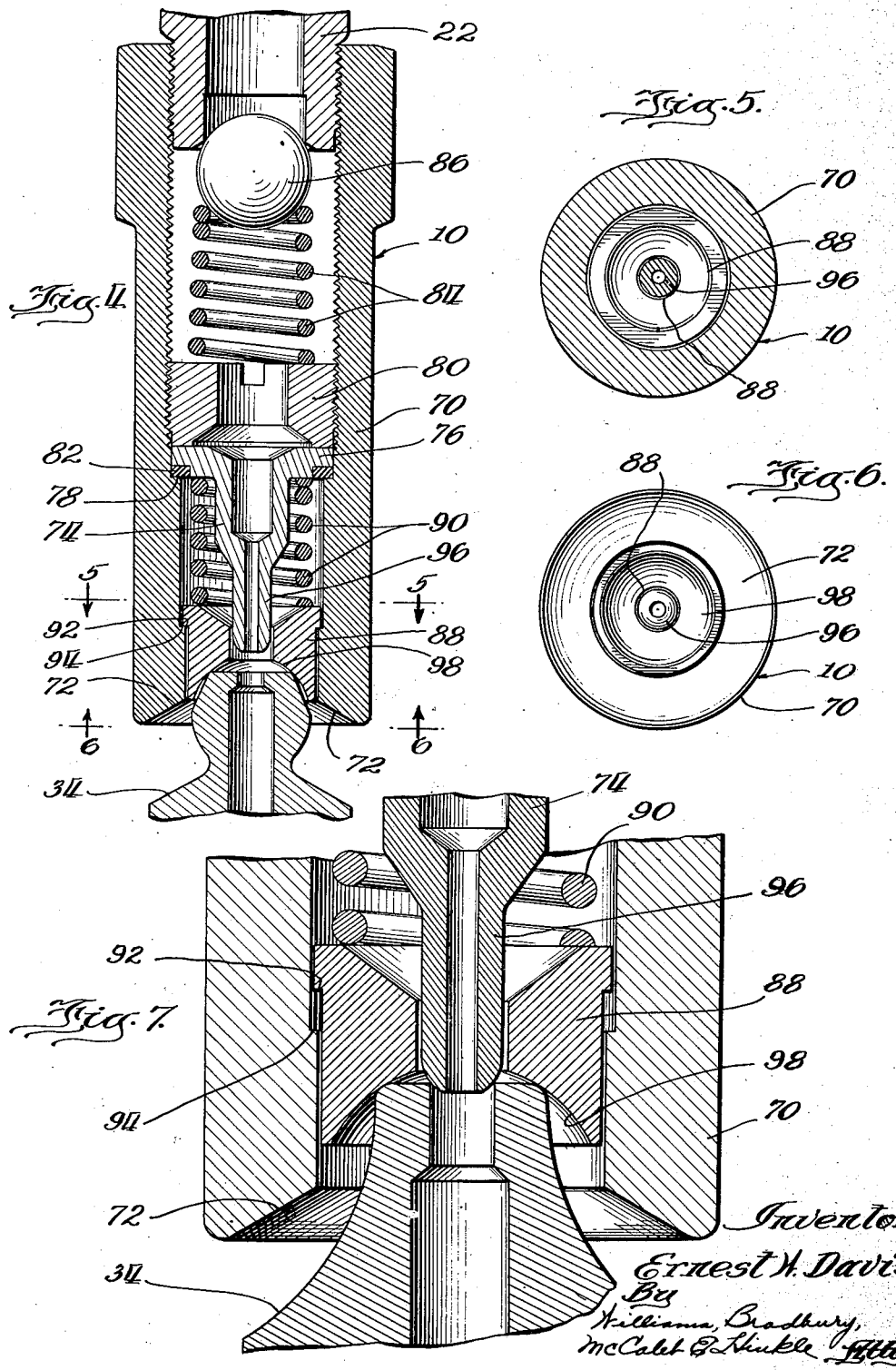

UNITED STATES PATENT OFFICE 2,070,003

LUBRICATING APPARATUS

Ernest W. Davis, Oak Park, Ill., assignor to Stewart-Warner Corporation, Chicago, Ill., a corporation of Virginia Application July 7, 1934, Serial No. 734,089

5 Claims. (Cl. 285—161)

My invention relates generally to lubricating apparatus, and more particularly to improvements in pressure contact nozzles for high pressure lubricating equipment.

It is an object of my invention to provide an improved high pressure lubricant tight contact nozzle having improved means for guiding the nozzle into accurate sealing contact with the fitting attached to the part to be lubricated.

A further object is to provide an improved means for centering the nozzle of a lubricant compressor relative to the lubricant receiving fitting to which it is applied.

Other objects will appear from the following description, reference being had to the accompanying drawings, in which:

Fig. 1 is an elevation of a high pressure lubricant compressor, nozzle, and lubricant receiving fitting, parts of the compressor being shown in cross section to show their operation;

Fig. 2 is a longitudinal sectional view of the contact nozzle showing the parts in the position assumed as it is being applied to a lubricant receiving fitting;

Fig. 3 is an enlarged fragmentary sectional view showing the nozzle in lubricant transmitting contact with the fitting;

Fig. 4 is a longitudinal sectional view of a modified form of nozzle;

Fig. 5 is a transverse sectional view taken on the line 5—5 of Fig. 4;

Fig. 6 is an end elevational view taken on the line 6—6 of Fig. 4; and

Fig. 7 is an enlarged fragmentary sectional view showing the nozzle in lubricant transmitting contact with the lubricant receiving fitting.

It is frequently very difficult properly to contact the nozzle of a high pressure grease gun with the lubricant receiving fitting when the nozzle comprises a so-called needle point, which to effect a seal with the fitting must be inserted into the relatively small inlet opening in the fitting. The inlet opening of the fitting may be as small as one-sixteenth of an inch in diameter. I have therefore provided an improved nozzle having a rectractile guide for facilitating the placing of the nozzle into sealing contact with the fitting.

As shown in Fig. 1, the improved nozzle 10 of my invention is illustrated as applied to a high pressure lubricant compressor comprising a barrel 12 having a follower piston 14 reciprocable therein, the piston being secured to a piston rod 16 which projects from the end cap 18 of the barrel and has a pistol grip handle 20 secured thereto. A high pressure cylinder 22 is mounted for reciprocation in a guide 24 secured to the lower cap 26. A plunger 28 is secured to an apertured plate 30 held at the lower end of the barrel 12 by the lower cap 26 and forms a guide for a compression coil spring 32 which engages the high pressure cylinder 22 and normally holds the latter in its outer position as indicated in Fig. 1.

In Fig. 1 the nozzle is shown as applied to a lubricant receiving fitting 34 threaded into the oil hole of a bearing 36. The fitting 34 may be of the type shown in U. S. Patent No. 1,475,980 to O. U. Zerk, or of the type shown in the application of Joseph Bystricky, Serial No. 661,713, filed March 20, 1933, or any other suitable type of fitting having a small inlet opening adapted to be engaged by a nozzle having a so-called "needle point" which contacts with the edge of the nipple about the inlet opening thereof.

The nozzle comprises a body 38 threaded to the end of the high pressure cylinder or discharge tube 22 and being suitably counterbored to form a cylindrical chamber 40 for a compression coil spring 42 which holds a ball check valve 44 against the outer end of the high pressure cylinder 22. The outer end of the body 38 is reduced in diameter and terminates in a tip 46 having a substantially spherical contact surface, the tip having a discharge passageway 48 formed therein. A sleeve 50 is threaded on the threaded portion 52 of the nozzle and has a flaring mouth 54 adapted to aid in guiding the nozzle into sealing contact with the fitting. Within the sleeve 50 a guide member 56 is slidably mounted, the member being normally pressed outwardly to the position in which it is shown in Fig. 2 by a compression coil spring 58. The guide member 56 is axially bored so as to slide freely over the cylindrical reduced diameter portion 60 of the nozzle and has a concave spherical contact surface 62 which is adapted to engage the peripheral edge of the tip of a lubricant receiving fitting. Outward movement of the guide member 56 relative to the sleeve 50 is prevented by interengagement of a sloping shoulder 64 formed within the sleeve 50 and a complementary tapered shoulder 66 formed on the guide member 56.

In using the lubricant compressor equipped with my improved form of nozzle the handle 20 is grasped and the nozzle pushed against the lubricant receiving fitting. As long as the nozzle is directed generally over the tip of the fitting it will be guided to a central position in axial alignment with the fitting initially by the flaring mouth 54 of the sleeve 50 and secondarily by the concave spherical surface 62 of the guide member 56. The nozzle will thus be guided over the fitting to the position in which it is shown in Fig. 2. Pressure upon the handle in a direction toward the fitting will thereupon cause lubricant to be fed under low pressure from the barrel 12 into the bore of the high pressure cylinder 22. Continued application of force to the compressor will cause the barrel to move downwardly relative to the high pressure cylinder 22 causing the plunger 28 to force the contents of the tube under high pressure past the outlet check valve 44. The spring 58 in the nozzle is weaker than the spring 32 in the compressor so that prior to the time that the plunger 28 enters the high pressure cylinder, the guide member 56 will have moved upwardly from the position in which it is shown in Fig. 2 to the position in which it is shown in Fig. 3, thereby to permit direct sealing contact between the rounded projection 46 of the nozzle and the edge of the lubricant receiving fitting surrounding its inlet opening.

Because of the fact that the area of contact between the nozzle and the fitting is very small, being substantially line contact about a circle having a diameter of approximately $\frac{1}{16}$ of an inch, the unit pressure is very high and a very tight seal is thus effected. The back pressure on the nozzle is likewise very small because of the small area of the inlet opening of the fitting. As a result a seal which is effective under pressures of several thousand pounds may readily be obtained.

In Figs. 4 to 7 inclusive I have illustrated a modified form of nozzle in which a sleeve 70 is threaded directly to the high pressure cylinder or discharge tube 22 of the lubricant compressor, the sleeve having a flaring mouth 72 to aid in guiding the nozzle into alignment with the fitting. The nozzle proper comprises a tube 74 having a flange 76, the flange being pressed against a shoulder 78 by a bushing 80 threaded in the bore of the sleeve 70. A gasket 82 of copper or other suitable material is interposed between the flange 76 and the shoulder 78 to prevent the leakage of lubricant. The bushing 80 also serves as a seat for the spring 84 of the ball check valve 86 which forms the outlet valve of the high pressure cylinder 22. A nozzle guide member 88 is reciprocable in the lower end cf the sleeve 70, being normally pressed outwardly by a coil spring 90 compressed between the flange 76 and the guide member.

Outward movement of the guide member is limited by the engagement of an annular shoulder 92 formed thereon with a complementary shoulder 94 formed in the bore of the sleeve 70. The guide member 88 is suitably apertured to receive the small diameter projecting portion 96 of the nozzle 74 and has a concave spherical contact surface 98 which is adapted to engage the tip of a lubricant receiving fitting and center the nozzle relative thereto.

Fig. 4 shows the nozzle with the parts in the position assumed upon initial engagement, while Fig. 7 shows the nozzle in lubricant transmitting engagement with the lubricant receiving fitting. The operation of the nozzle shown in Figs. 4 to 7 inclusive is substantially identical with the operation of the nozzle shown in Figs. 1 to 3 inclusive, and need not therefore be described in detail. The nozzle shown in Figs. 4 to 7 has the advantage that the nozzle proper 74 is of relatively small size and may therefore be economically made of a very hard and durable metal and be suitably heat treated without great expense.

While I have disclosed specific embodiments of my invention, it will be readily understood by those skilled in the art that variations may be made in the construction disclosed without departing from the basic features of my invention. I therefore do not wish to be limited to the precise construction disclosed, but wish to include within the scope of my invention all such modifications and variations which will readily suggest themselves.

What I claim as new and desire to secure by United States Letters Patent is:

1. A nozzle for high pressure lubricant compressors, comprising a sleeve, a small diameter nozzle part rigid with respect to said sleeve, and a guide member mounted within said sleeve and surrounding said nozzle part, said guide member being reciprocable relative to said nozzle part and sleeve, said guide member having a surface adapted to engage a lubricant receiving fitting and aid in centering the nozzle over the fitting, and a spring for urging said guide member outwardly of said nozzle.

2. A nozzle for high pressure lubricating apparatus comprising, a discharge conduit, a sleeve secured to said conduit, a small diameter nozzle rigidly secured within said sleeve, and spring pressed retractile means positioned within said sleeve, surrounding the contact portion of said nozzle, and having a flaring surface for guiding said nozzle into alignment with a lubricant receiving fitting.

3. In a nozzle for high pressure lubricant compressors, the combination of a small diameter nozzle part, a sleeve threaded on said nozzle part and protecting the latter, and a spring pressed guide member mounted within said sleeve and reciprocable relative thereto, said guide member having a flaring surface for engaging a lubricant receiving fitting and aiding in centering the nozzle over the fitting.

4. A nozzle for high pressure lubricating apparatus comprising, a discharge conduit, a sleeve secured to said conduit, and having an internal shoulder, a small diameter nozzle part rigidly secured in said sleeve against the shoulder thereof, and spring actuated means positioned within said sleeve, surrounding the contact portion of said nozzle part and having a flaring surface for guiding said nozzle into alignment with a lubricant receiving fitting.

5. A nozzle for high pressure lubricating apparatus comprising, a small diameter nozzle part insertable partially into the inlet opening of a lubricant receiving fitting, means slidable relative to said part for aiding in centering the latter over such fitting, a spring urging said means outwardly, and a sleeve surrounding said spring and said means and having means for limiting the extent of outward sliding movement of said means.

ERNEST W. DAVIS.